(12) United States Patent
Kelley (10) Patent No.: US 6,263,864 B1
(45) Date of Patent: Jul. 24, 2001

(54) ALTERNATE FUEL SYSTEM FOR INTERNAL COMBUSTION ENGINES

(75) Inventor: Sean T. Kelley, Dover, DE (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/596,929

(22) Filed: Jun. 19, 2000

(51) Int. Cl.[7] .................................................. F02B 43/00

(52) U.S. Cl. .............................. 123/527; 141/4; 141/18

(58) Field of Search .................................. 123/1 A, 3, 527; 141/4, 18; 137/12; 62/50.1, 50.5

(56) References Cited

FOREIGN PATENT DOCUMENTS

WO-0079176-A1 * 6/1999 (WO).

* cited by examiner

Primary Examiner—Noah P. Kamen
(74) Attorney, Agent, or Firm—Bobby D. Scearce; Thomas L. Kundert (57) ABSTRACT

A fuel supply system for an internal combustion engine utilizing hydrogen, natural gas or other alternate fuel is described which includes a pressure vessel for containing liquid fuel in a first compartment and gaseous fuel in a second compartment, the compartments separated by a movable piston configured to maintain the fuel in liquid and gaseous phases by maintaining constant, but different pressures, respectively, in the two compartments regardless of fuel quantity in either compartment. A thermal expansion system interconnecting the two compartments draws fuel from the first compartment and expands the fuel to a superheated gas into the second compartment for transfer to the engine.

10 Claims, 6 Drawing Sheets

ALTERNATE FUEL SYSTEM FOR INTERNAL COMBUSTION ENGINES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to fuel systems for internal combustion engines, and more particularly to an improved fuel supply system for an internal combustion engine utilizing hydrogen or natural gas for fuel.

Internal combustion engines in cars and trucks may account for as much as about one-third the pollution emitted into the environment. Internal combustion engines used in trains, boats, ships, airplanes, factories, power plants, and the like add substantially to the pollution. Vehicles utilizing alternate sources of fuel such as natural gas, ethanol, methanol, hydrogen, electricity, solar power, have been developed for reducing environmental pollution and utilizing natural resources more efficiently, but generally have short operating range and long refueling times. Also, it may be illusory to characterize electric vehicles as benefiting the environment because many electric power plants typically use more fossil fuel in generating the electricity for charging an electric vehicle than the vehicle would burn using an ordinary internal combustion engine. Automobile manufactures have made significant progress in development of alternate fuel vehicles, but limited operating range and long refueling times remain significant problems.

The invention described herein solves or substantially reduces in critical importance problems with prior alternate fuel systems by providing a constant pressure, variable volume pressure vessel system for the storage of alternate fuel sources aboard cars, trucks, trains, boats, ships and airplanes, and for use in factories, power plants and the like using internal combustion engines. The system is configured to maintain constant pressure in the fuel vessel regardless of the quantity level and without any electrical assistance. By maintaining a constant pressure, the saturation temperature of any alternate fuel can be controlled and held somewhat higher than ambient temperatures so that none of the liquefied fuel will be allowed to flash. The ambient and saturation temperatures are held proportional, regardless of ambient temperature, so the system will work the same in all climates. In this system, the fuel is introduced into the system as a liquid. With other existing pressure vessels, constant pressure is not maintained and thus, saturation temperatures begin falling below ambient temperatures as the quantity of fuel in the system decreases due to the decrease in pressure. Consequently, liquefied fuel being contained by other such vessels will transform from a sub-cooled to a saturated liquid, flash from a saturated liquid into a saturated vapor, and then transform from a saturated to superheated vapor, while remaining at an almost constant temperature.

The invention may benefit any power plant system using an internal combustion engine and may be adapted to function as a static stowage vessel for volatile liquefied alternate fuels such as hydrogen and natural gas at ambient temperature and to transform them into gases prior to dispensing without electrical assistance. The invention may also provide ultra-efficient compressed fluid systems for aircraft and medical oxygen systems and other such uses, and may provide vehicle operating ranges and refueling times favorably comparable to a vehicle using ordinary fuel.

Fuels that are gaseous at room temperature and pressure but that can be stowed as a liquid are preferred, such as natural gas and hydrogen, which are relatively inexpensive and abundant. Three separate configurations for the invention are described. The first configuration (least preferable) is used if the pumping station or processing facility can pump the fuel in the liquefied phase either at ambient temperature and high pressure or low pressure and very low temperature. The second configuration (more preferable) can be used only if the liquid fuel is available at ambient temperature and high pressure. The high pressure is required to keep the saturation temperature of the fuel high enough so that ambient temperature can be maintained without the fuel flashing into vapor. Both the first and second configurations utilize an onboard initialization system that stows residual fuel as new fuel is pumped into the system at the processing station. The third configuration (most preferable) also requires the fuel to be at ambient temperature and extremely high pressure, but uses a return feed system to return the residual gaseous fuel back to the processing station while new high pressure, ambient temperature, sub-cooled liquid fuel is pumped into the system. The third configuration is most preferred because the onboard initialization system is not required, which greatly facilitates refueling and significantly reduces the number of components, and consequently the chance of failure, of the system. Note that two methods of transferring the fuel herein described are at high pressure and ambient temperature (herein referred to as "condition 1") or low pressure and extremely low temperature (herein referred to as "condition 2"). The first configuration system can refuel under both condition 1 and condition 2 circumstances, and the second and third configurations can only be refueled under condition 1 circumstances.

Assume two empty pressure vessels identical in volume contain natural gas as a fuel source. Assume further that one of the vessels is filled with compressed natural gas in the gaseous phase and rigidly sealed off so that none can escape, and, still further, that the second vessel is filled with low temperature, ambient pressure, liquefied natural gas and sealed off so that none can escape. If the vessels are allowed to sit for a period of time until their temperatures equal the ambient temperature, the first vessel would still contain compressed natural gas in the gaseous phase and the second vessel would still contain liquefied natural gas. Because of its rigidity, the second vessel does not allow any of the liquefied natural gas to expand as it warmed to ambient, and the saturation temperature rises proportionally with the rise in ambient temperature (as well as pressure) and the natural gas in the second vessel remains in the liquid state even as it warms to ambient and above. The vessel with liquefied natural gas will contain substantially higher mass than the vessel containing compressed natural gas in the gaseous phase.

The invention takes advantage of the physics just described to give the vehicle equal or greater range than other vehicles, by converting the liquefied fuel source into the gaseous phase before transferring it to the engine. This system also makes refueling much faster because the liquefied fuel does not require compressing. The fuel is stowed as an ambient temperature, high pressure, slightly subcooled liquid, expanded several hundred times into a superheated gas, and then combusted as a superheated gas in the engine at about the same volume ratio as ordinary fuels. In condition 2 alternate refueling, because the pressure vessel adjusts its own internal volume at the rate the liquid fuel is drawn from the vessel while maintaining rigidity all the while, the fuel is not allowed to expand in volume as it gradually warms to ambient temperature, which causes the pressure and the saturation temperature to increase correspondingly. Upon stabilizing at ambient temperature, the saturation temperature remains higher than ambient and the fuel remains a subcooled liquid. Ordinary fuel sequencing can take place during this entire cycle. In condition 1 refueling, the temperature will already be ambient, so no temperature change will take place.

It is therefore a principal object of the invention to provide an improved fuel supply system for internal combustion engines.

It is another object of the invention to provide a fuel supply system for internal combustion engines using hydrogen, natural gas or other alternate fuel.

It is yet another object of the invention to provide a fuel supply system for internal combustion engines providing long operating ranges and short refueling times for the vehicle.

It is a further object of the invention to provide a pressure vessel for containing and delivering fuel to an internal combustion engine using hydrogen, natural gas or other alternate fuel.

These and other objects of the invention will be become apparent as a detailed description of representative embodiments of the invention proceeds.

SUMMARY OF THE INVENTION

In accordance with the foregoing principles and objects of the invention, a fuel supply system for an internal combustion engine utilizing hydrogen, natural gas or other alternate fuel is described which includes a pressure vessel for containing liquid fuel in a first compartment and gaseous fuel in a second compartment, the compartments separated by a movable piston configured to maintain the fuel in liquid and gaseous phases by maintaining constant, but different pressures, respectively, in the two compartments regardless of fuel quantity in either compartment. A thermal expansion system interconnecting the two compartments draws fuel from the first compartment and expands the fuel to a superheated gas into the second compartment for transfer to the engine.

DESCRIPTION OF THE DRAWINGS

The invention will be more clearly understood from the following detailed description of representative embodiments thereof read in conjunction with the accompanying drawings in which like symbols indicate like type components in the various views and wherein.

DETAILED DESCRIPTION

Figure 1:
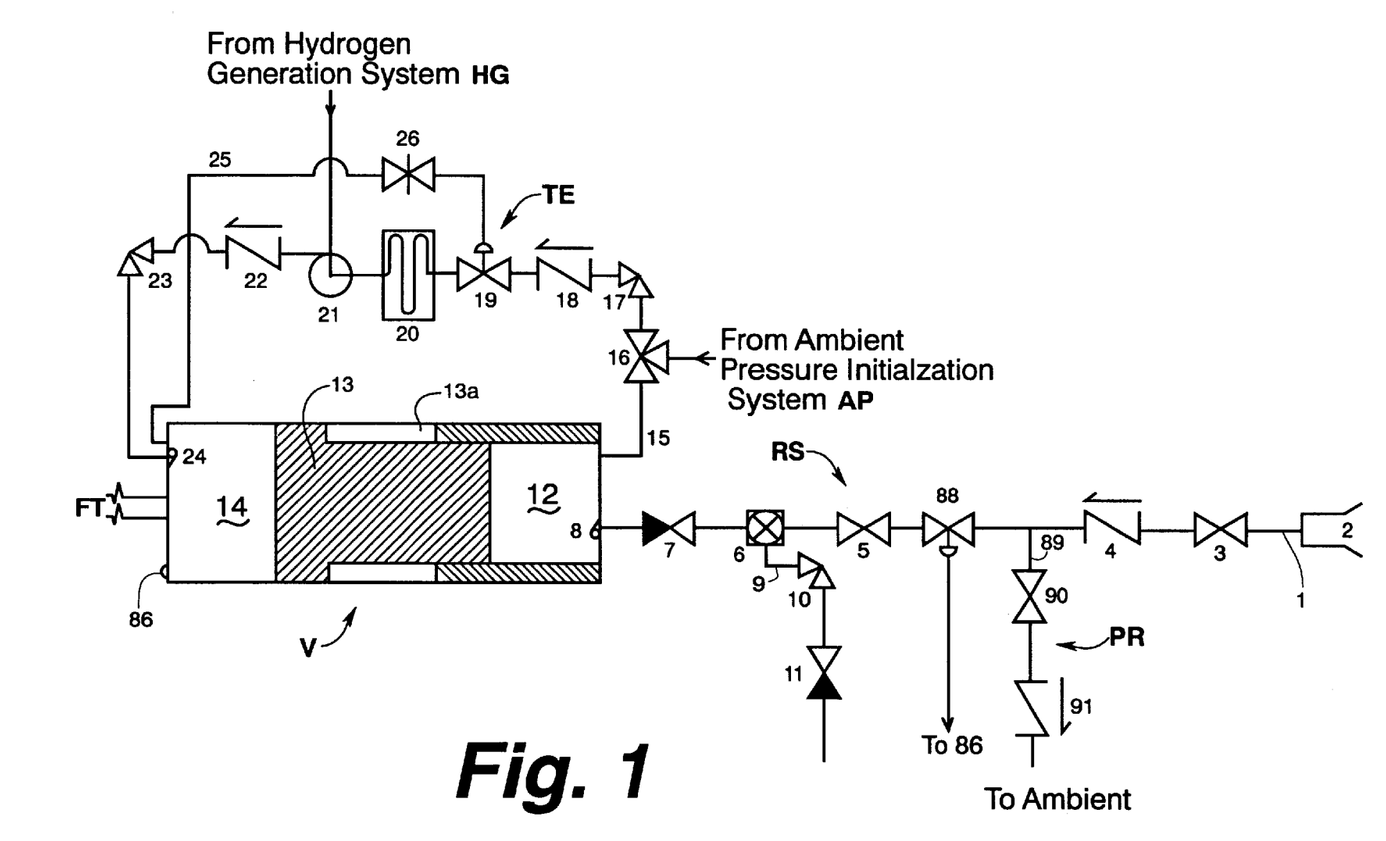
FIG. 1 shows schematically the refueling system, the thermal expansion system and an axial section view of the main pressure vessel system of the invention.
Figure 2:
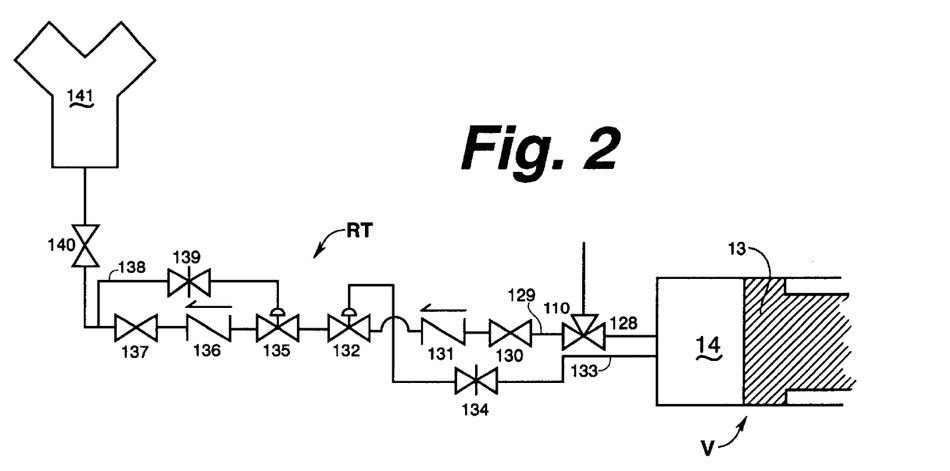
FIG. 2 shows a schematic diagram of the system for transferring fuel to the engine according to the invention.

Referring now to the drawings, FIG. 1 is a schematic of refueling system RS, main pressure vessel V and thermal expansion system TE of the invention. System RS transfers liquid alternate cryogenic fuel from a pumping station (not shown) to high pressure compartment 12 of pressure vessel V. Pressure vessel V stores fuel in both liquefied and gaseous phases prior to consumption in the engine (FIG. 2). System TE is configured to thermally expand liquid fuel into gas for consumption in the engine. Vessel V may be constructed of any suitable material including metal or composite material as might occur to the skilled artisan practicing the invention.

System RS includes refuel line 1 through which fuel is directed from a pumping station to vessel V. Fuel is pumped in a liquefied state through line 1 whether in condition 1 or 2. When the vehicle is to be refueled, the pumping station nozzle or transfer attachment is rigidly connected to hermetic seal 2 so that fuel can be transferred in condition 1 under intense pressure or in condition 2 at very low temperature. The connection of the nozzle or transfer attachment to hermetic seal 2 is such that no liquefied fuel can escape and high pressure or extremely low temperature can be maintained on the fuel during transfer to keep it from reaching saturation conditions and vaporizing. As a safety precaution, hermetic seal 2 should be configured so that it cannot be disconnected from the nozzle of the pumping station unless the internal line pressure is at or near ambient.

Normally closed globe valve 3 acts as a discharge valve from hermetic seal 2 and an intake valve to swing check valve 4 and, along with valves 4, 5, and 7, isolates hermetic seal 2, system RS, vessel V and the rest of the system to allow seal 2 to be removed for maintenance without emptying vessel V. Valve 3 may also be used to throttle the flow rate of the incoming fuel. Swing check valve 4 prevents fuel flow from vessel V, and prevents rapid decompression of vessel V through line 1 in the event that hermetic seal 2 is broken during fueling. Normally closed globe or gate valve 5 serves as a discharge valve from valve 4 and an intake valve to float valve 6, isolates valves 3 and 4 from vessel V for maintenance purposes. Valves 4 and 5 may be switched in position.

Float type valve 6 separates liquefied fuel from any gases in the fuel so that only liquid fuel flows into vessel V. Gases that are separated flow through gas discharge line 9 to the atmosphere or, as described below, elsewhere in the system such as compartment 14 of vessel V (not shown in FIG. 1). Normally opened angled globe valve 10 isolates valve 6 from the atmosphere or the rest of line 9, and normally open stop check valve 11 permits gas flow only away from valve 6 through line 9. Normally closed stop check valve 7 prevents liquefied fuel from flowing from vessel V and permits isolation of valve 6 for maintenance purposes without emptying vessel V. Flapper check valve 8 protects vessel V from rapid decompression in the event line 1 is ruptured.

Pressure vessel V is substantially tubular in shape and comprises liquid fuel compartment 12 and gas stowage compartment 14 separated by movable piston 13 and is configured to maintain fuel in liquid and gaseous phases by maintaining substantially constant but different pressures, respectively, in compartments 12 and 14 regardless of fuel quantity in either compartment.

In a preferred configuration for vessel V, piston 13 length, measured from crown to crown (from piston 13 surface exposed to compartment 12 to piston 13 surface exposed to compartment 14), is substantially equal to one-third (⅓) the overall internal length of vessel V. One-half of the internal length of vessel V has a first inner diameter equal to that of compartment 12 and the other half has a second inner diameter equal to that of compartment 14. Piston 13 is otherwise configured so that half of it has a diameter equal to that of compartment 12 and half has a diameter equal to that of compartment 14. Each half of piston 13 has length equal to ⅙ the overall internal length of vessel V, so that piston 13 fits snugly within compartment 12 in the rightmost position and snugly within compartment 14 in the leftmost position with no dead space when piston 13 is in the leftmost or rightmost position. Compartments 12 and 14 have maximum length each of ⅓ the vessel internal length. It is noted that the crowns of piston 13 may be convex as well as flat, so long as the internal end surfaces of vessel V have corresponding shapes that match snugly with the respective crowns. A small vent hole 13a may be provided in the wall of vessel V substantially as shown in FIG. 1 to allow piston 13 to move back and forth without pressure resistance.

As might occur to the skilled artisan guided by these teachings, vessel V may be smaller in volume than a conventional fuel tank for the same vehicle operating range. Fuel is first stowed as liquid in compartment 12 and maintained there at high pressure at ambient temperature. Gaseous fuel is drawn from compartment 14 for consumption in the engine as described below in relation to system FT of FIG. 2. Upon demand from the engine, fuel passes from compartment 12 into system TE, expands into gas and flows into compartment 14 at a lower pressure than in compartment 12, so that the saturation temperature of the liquefied fuel is kept at or above ambient temperature.

In order to properly size vessel V for a particular application, the pressure to maintain the fuel (hydrogen or natural gas) in a slightly subcooled state at the highest ambient temperature that vessel V will likely encounter during operation (about 110–130° F.) is first determined. An operating pressure for compartment 14 near the high end of the pressure range at which the engine will accept gaseous fuel is selected to minimize the difference in surface areas between the crowns of piston 13. The maximum allowable radius of the crown exposed to compartment 14 is then determined, and depends primarily on the required size of vessel V for the intended purpose (e.g., a train, large or small plane or vehicle, etc). Given the pressures required in compartments 12 and 14 and the radius of the crown of piston 13 exposed to compartment 14 consistent with the selected vessel V size, the radius of the crown exposed to compartment 12 to maintain an equilibrium piston force can be determined using the equation, $(Pressure_{14})/(Area_{13,14})=(Pressure_{12})/(Area_{13,12})$, where the 12,13 and 14 subscripts indicate the pressures within compartments 12 or 14 and the areas of the crowns exposed to compartments 12 and 14. Note that the selected equilibrium pressure does not account for any friction between piston 13 and vessel V that could resist movement of piston 13.

Consider the example of a vessel V for use on a domestic full-sized pickup truck. Consider that the truck has space for a cylindrical vessel 38 inches long and 8 inches in diameter. If the wall thickness of the vessel is one inch for the selected material of construction as determined using strength calculations by one skilled in the applicable pressure vessel art, the internal dimensions of the vessel are 36 inches long and compartment 14 is 6 inches in diameter. Piston 13 is ⅓ times 36 inches, or 12 inches, from crown to crown. One-half the piston length has an outer diameter equal to the diameter of compartment 14 and the other half the diameter of compartment 12. The piston diameter within compartment 12 is determined by first selecting the maximum ambient temperature (130° F.) to which the pressure vessel in the example truck is exposed. The pressure to maintain slightly subcooled hydrogen at 130° F. is then determined, say about 5000 psi. Given that the engine of the truck can accept gaseous hydrogen fuel at about 600 to 1000 psi, a pressure at the higher end of the range is selected for compartment 14 to minimize the difference in crown areas. Inverting the equation presented in the foregoing paragraph, the area of the crown exposed to compartment 12 is given by, $Area_{13,12}=(Pressure_{12})(Area_{13,14})/(Pressure_{14})=1000\pi(3)^2/5000=5.655$ in$^2$. The diameter of the crown exposed to compartment 12 in the example is equal to 2.684 inches. Note, however, that this is the diameter required to maintain equilibrium piston force. A force on the left crown slightly greater (50 pounds or more depending on the size of piston 13 and the engine for which it is used) than that on the right is needed in order to overcome friction in moving piston 13 from left to right as gaseous hydrogen is drawn from compartment 14 for combustion in the engine during normal operation. The diameter of the crown exposed to compartment 12 is then recalculated at a slightly smaller value, viz., 2.680 inches. Once the final dimensions of vessel V are determined for a particular application, thermal expansion valve 19 may then be calibrated to maintain the desired pressure differential between compartments 12 and 14.

Because the two crown areas are different, vessel V maintains the pressure difference without electrical assistance. The pressures are held constant by thermal expansion valve 19 that functions the same regardless of fluid ambient or external ambient temperatures if they differ.

As fuel is consumed in the engine, piston 13 moves to the right and decreases compartment 12 volume at the rate liquid fuel is demanded by system TE in maintaining constant pressure in compartment 14. By varying the volume of compartment 12, the pressure is held constant and the saturation temperature is maintained constant. As a result, the system maintains fuel as liquid in compartment 12 regardless of amount of fuel therein, even if the engine is turned off. Decreasing the volume of liquid compartment 12 at the rate of fuel expenditure is performed mechanically by the constant pressure in compartment 12 applied by the right side of piston crown 13. Pressures in compartments 12 and 14 will be different, but each pressure will be held constant regardless of their individual volumes. When vessel V is full, piston 13 is in the left-most position to accommodate the liquid fuel in compartment 12. When piston 13 is in the left-most position, compartment 14 is at minimum volume and compartment 12 is at maximum volume. As gaseous fuel is directed to the engine, valve 19 opens to allow liquid fuel to pass from compartment 12 to compartment 14 in maintaining constant pressure in compartment 14. As fuel travels through thermal expansion line 15, it is transformed from slightly sub-cooled liquid into a superheated gas. As fuel is admitted from compartment 12 to compartment 14 via line 15, piston 13 moves to the right in reaction to the greater net force to the right. The pressure of the fuel decreases as it travels through valve 19. Because the crown area in compartment 14 is greater than the crown area in compartment 12, piston 13 maintains a greater net force to the right. By applying greater force to the right, piston 13 maintains pressure in compartment 12 greater than that which system TE maintains in compartment 14, thereby forcing the liquid to remain liquid and allowing the gas to remain gas.

Refuel line trip and pressure relief system PR may be operatively connected to system RS to provide means for automatically shutting off fuel flow from the pumping station to vessel V on completion of refueling. As fuel flows through line 1 to vessel V, piston 13 moves to the left, and, when fully refueled, is in the left-most (as FIG. 1 is viewed) position at which limit switch 86, or other limiting switch means suitable for the purpose, is actuated. Switch 86 shuts off fuel flow once vessel V is fully charged by actuating valve 88 in line 1 and/or (normally closed gate) valve 90 and check valve 91 in pressure relief line 89 to allow residual pressure in line 1 to reduce to ambient so that seal 2 can be disconnected from the pumping station.

System TE includes thermal expansion line 15 for transporting liquid fuel from vessel V, compartment 12 for expansion from a saturated or sub-cooled liquid into superheated gas. Three-way valve 16 is required only for a system configured for receiving condition 2 fuel (see FIG. 7 below). If the system is refueled with condition 2 fuel, the pressure of compartment 12 must be dropped to receive fuel in a low pressure, extremely low temperature condition. Residual liquid fuel in compartment 12 must be removed prior to dropping the pressure to avoid flashing into superheated gas and render refueling more complicated. Accordingly, compartment 12 is evacuated and residual liquid fuel is evacuated to a separate system AP (see FIG. 3 below) for repressurization.

Normally open angled globe valve 17 acts as an intake valve to system TE and, along with valves 23 and 26, allows system TE components to be isolated for maintenance purposes. Swing check valve 18 prevents fuel flow back through line 15. Valve 19 decreases the pressure to flash part or all the fuel from slightly sub-cooled liquid to saturated or preferably superheated gas. Valve 19 may be pressure activated, downward seated, with spring force acting on the bottom of the actuator diaphragm, and ambient pressure from compartment 14 acting on the top of the diaphragm, or pressure activated, upward seated, with spring force acting on the top of the diaphragm, and ambient pressure from compartment 14 acting on the bottom of the diaphragm.

Heat exchanger 20 serves to complete the transformation of saturated liquid and/or gaseous fuel to a superheated gas. Different fuels have respective characteristic saturation properties at different temperatures and pressures. In some cases, all the fuel is transformed from liquid to gas through valve 19. In cases where all the fuel is converted from liquid to saturated or superheated gas at valve 19, heat exchanger 20 may not be needed. The pressure drop may need to be supplemented with the heat exchanger. In some cases, only a slight pressure drop may be required to transform the saturated or slightly sub-cooled liquefied fuel into a saturated or superheated gas.

Optional compressor 21 may be used to compress superheated fuel entering compartment 14, and may be powered off the engine, the electrical system or other means. Swing check valve 22 ensures that fuel only travels one way from valve 19 or heat exchanger 20 and compressor 21. Valve 22 may act as a redundant system to optional flapper check valve 24 and valve 18. Normally open angled globe valve 23 discharges gas from system TE to compartment 14. Valves 23, 17 and 26 allow system TE to be isolated for maintenance purposes. Valve 24 protects compartment 14 from rapid decompression if line 15 ruptures between compartment 14 and valve 22.

Thermal expansion valve actuator line 25 actuates valve 19 from pressure in compartment 14, and is connected so that it exposes one side of the actuator diaphragm to the ambient pressure in compartment 14. In turn, pressure from compartment 14 opposes an adjustable spring force on the other side of the actuator diaphragm in valve 19. As pressure in compartment 14 decreases, the spring force in the actuator diaphragm of valve 19 overcomes ambient pressure and opens the valve to allow fuel to pass through it. As this occurs, pressure in compartment 14 restores to a preset value, and once restored to the preset value, the pressure on the ambient pressure side of the actuator diaphragm will overcome the opposing spring force and close valve 19, but this is typically a throttling process rather than a cyclical process. Normally open gate valve 26 enables the valve 19 actuator line to be isolated from vessel V for maintenance of system TE components.

Optional hydrogen generation system HG (not shown), such as an electrolysis unit or other system known in the art as contemplated by one skilled in the art guided by these teachings, may be operatively connected into system TE as at compressor 21 if onboard hydrogen generation is included on the vehicle. Fuel lines and valving shown in the various figures presented herein as interconnecting system HG to any of the systems and subsystems described herein would not be included in a fuel system of the invention for a vehicle not including hydrogen generation.

An optional pressure vessel decompression subsystem PVD and purging subsystem PS useful in emptying and purging the system if needed, and an over-pressure relief subsystem OPR (see FIGS. 5,6,7 below), which may be configured by the skilled artisan in accordance with the invention, may be operatively connected to vessel V. Bleed valves (not shown) may be inserted at substantially any location in the system as would occur to the skilled artisan practicing the invention, so that all line pressures can be bled after the various systems have been isolated from the main pressure vessel system.

Referring now to FIG. 2, shown therein is a schematic diagram of system RT comprising a portion of the system of the invention for transferring fuel from compartment 14 of vessel V to engine 141. System RT transports residual gaseous fuel from vessel 103 via line 107 (see discussion below in relation to system AP) to compartment 14 until compartment 14 is fully repressurized after condition 2 refueling and vessel 103 is emptied of residual gaseous fuel after compartment 14 is fully repressurized after refueling, maintains a minimum operating pressure in compartment 14, and prevents engine 141 from being over-pressurized.

After the system is refueled at condition 2, gaseous fuel is compressed from vessel 103 through line 128 to compartment 14. Once compartment 14 is fully pressurized to apply pressure to piston 13 so that liquefied fuel in compartment 12 is kept in a liquefied phase, three-way valve 110 directly connects vessel 103 with discharge line 129 to engine 141. If fuel is pumped into the system at condition 1, compartment 14 would not be repressurized because the pressure would not have dropped for refueling. When compartment 14 is at full operating pressure, valve 110 will bleed pressure from vessel 103 to engine 141. Once vessel 103 is empty, valve 110 will draw gaseous fuel from compartment 14 to engine 141. If the system is fueled at condition 2, valve 110 will retain full operating pressure within compartment 14 after refueling, then empty vessel 103 to engine 141, and fully allow gaseous fuel to be drawn directly from compartment 14 to engine 141. If the system is fueled at condition 1, compartment 14 will already be at full operating pressure and valve 110 will first empty vessel 103 to engine 141 and allow gaseous fuel to be drawn directly from compartment 14 to engine 141 until the next refueling. After pressure in vessel 103 drops to a few PSIG or the minimum engine operating pressure, and valve 110 configures itself to draw from compartment 14, fuel will flow left through line 128 into engine 141.

Normally open globe valve 130 in conjunction with normally open gate valve 134 allows isolation of any component between valve 110 and engine 141 so that components can be removed for maintenance or inspection without having to decompress compartment 14. Swing check valve 131 ensures no back-flow of gaseous fuel to valve 110.

Low-pressure cut-out regulator valve 132 ensures that pressure in compartment 14 does not drop below a specific value via line 128 during consumption by engine 141. When pressure in compartment 14 drops below a preset value, valve 132 closes. Because valve 19 is activated by the pressure in compartment 14, when the pressure in compartment lowers, valve 19 opens to allow more fuel from compartment 12 to compartment 14 via system TE. When valve 132 closes due to low pressure, valve 19 will open or remain open to restore pressure to compartment 14. Once the pressure in compartment 14 is restored, valve 132 will open. Valve 132 will either be pressure activated, downward seated, with spring force acting on top of the actuator diaphragm, and ambient pressure from compartment 14 acting on the bottom, or be pressure activated, upward seated, with spring force acting on the bottom of the actuator diaphragm, and ambient pressure from compartment 14 acting on the top of the actuator diaphragm.

Line 133 actuates valve 132 and is connected to expose one side of the actuator diaphragm to the ambient pressure in compartment 14. The side of the actuator diaphragm exposed to pressure in compartment 14 will oppose an adjustable spring force on the other side. If the pressure in compartment 14 decreases, the spring force in the actuator diaphragm of valve 132 will overcome opposing force caused by the pressure in compartment 14 and act to close the valve to prevent more gaseous fuel from escaping vessel 14 and further decrease its pressure. Once the pressure in compartment 14 increases as fuel is evaporated from compartment 12 through system TE, the force on one side of the actuator diaphragm will exceed the opposing spring force and allow valve 132 to open so that flow from compartment 14 to engine 141 can once again take place. If valve 132 closes completely, engine 141 will stop for lack of fuel.

Normally open gate valve 134 in conjunction with valve 130 allows isolation of components between valve 110 and engine 141 for removal and maintenance or inspection without decompressing compartment 14. High-pressure cut-out regulator valve 135 maintains a constant pressure in line 129 leading to engine 141 and limits the maximum pressure in line 129 to protect engine 141. Once the vehicle is driven a distance sufficient that no fuel is available from compartment 12, valve 132 will close to prevent compartment 14 from dropping below the specified value required to maintain pressure in compartment 12 to keep any residual liquid fuel from flashing. At that point, engine 141 will stop and the system must be refueled. Valves 135 and 132 operate independently of each other. Valve 135 will either be pressure activated, downward seated, with spring force acting on the bottom of the actuator diaphragm and ambient pressure from the part of line 129 leading to engine 141 acting on the top, or be pressure activated, upward seated, with spring force acting on the top of the actuator diaphragm and ambient pressure from the part of line 129 leading to engine 141 acting on the bottom.

Swing check valve 136 ensures no back-flow of gas through valve 135. Normally open globe valve 137, used in conjunction with valves 130 and 125, allows isolation and removal of valve 135 without having to decompress any system. Pressure regulator valve actuator line 138 actuates valve 135, and is connected so that it exposes one side of the actuator diaphragm to the ambient pressure in line 129 at engine 141, which, in turn, opposes an adjustable spring force on the other side of the actuator diaphragm. If the pressure in line 129 at engine 141 decreases, the spring force on the actuator diaphragm of valve 135 will overcome the opposing force caused by ambient pressure in line 129 and open the valve to allow more gaseous fuel to engine 141. If the pressure in line 129 at engine 141 gets high, then valve 135 will close to prevent more gaseous fuel from entering line 129 and over-pressurizing engine 141. Normally open gate valve 139 in conjunction with valve 137 allows isolation and removal of valve 135 without having to decompress any part of the system. Normally open globe valve 140 isolates engine 141 from the fuel system.

Figure 3:
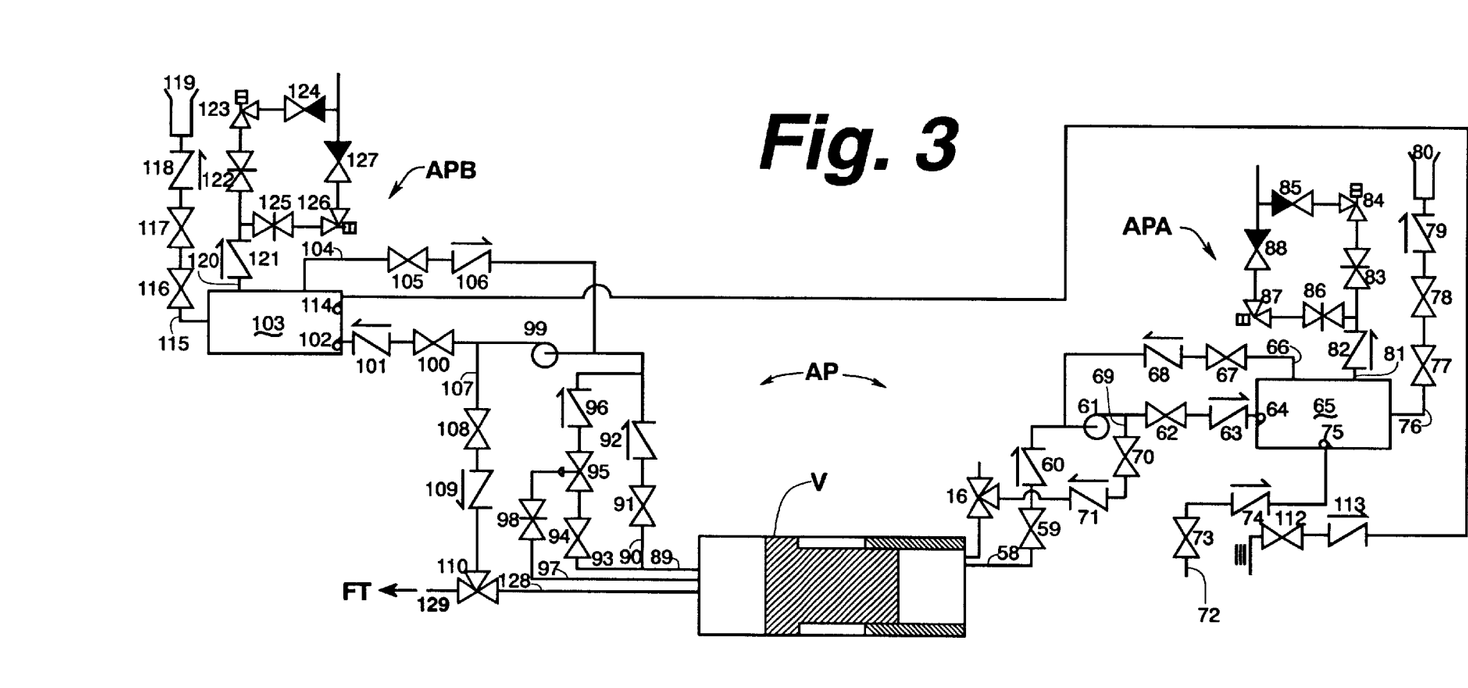
FIG. 3 shows a schematic diagram of ambient pressure initialization system AP configured for primary pressurization of the fuel system of the invention for condition 1 or 2 fuel, configuration 1 containing all of system AP, configuration 2 containing only part of system AP and configuration 3 containing none of system AP.

FIG. 3 shows a schematic diagram of the ambient pressure initialization system AP configured for primary pressurization of the fuel system of the invention for fuel in condition 1 or 2. System AP consists of two subsystems, namely, subsystem APA operatively connected to compartment 12 of vessel V and subsystem APB operatively connected to compartment 14.

In subsystem APA, liquid initialization system suction line 58 transports residual liquid fuel from compartment 12 to liquid initialization vessel 65. The volume of vessel 65 must be at least as large as the maximum volume of compartment 12. If compressor 61 cannot compress vessel 65 at the same original pressure that compartment 12 operates at, then, neglecting any flashing that took place during transfer, the product of pressure times volume in compartment 12 before compression of vessel 65 should equal the product of pressure times volume in vessel 65 after compression of vessel 65, viz., $P_{12}V_{12}$ (before compression of 65)=$P_{65}V_{65}$ (after compression of 65). If a significant temperature change occurs in either compartment 12 or vessel 65, then $P_{12}V_{12}/T_{12}$ (before compression of 65)= $P_{65}V_{65}/T_{65}$ (after compression of 65), where T is measured in °K. If incomplete compression takes place, the volume of vessel 65 must accommodate. The system cannot be refueled again until vessel 65 is empty of residual fuel, which consideration further renders the third configuration the most desirable embodiment of the invention.

When refueling at condition 2, compartment 12 pressure must be dropped to near vacuum and compartment 14 pressure to near ambient to allow fuel to enter the system during refueling and to eliminate gas pockets in compartment 12. Normally closed globe valve 59 and normally open globe valve 70 isolate the liquid side of system AP from compartment 12 when the liquid initialization system is not in use. Valve 58 is fully open when compressor 61 is drawing suction from compartment 12 and fully closed during all other times. Valves 70,67 are closed when compressor 61 is compressing vessel 65 and open at all other times. Swing check valve 60, along with other check valves in subsystem APA ensures no back-flow through line 58. Compressor 61 transports residual liquid fuel from compartment 12 into vessel 65, and draws near vacuum on compartment 12 so that condition 2 fuel can enter compartment 12 via line 1 without gas pockets.

Once refueling is complete, valve 16 will configure itself to draw from vessel 65 until it is empty and then to draw from compartment 12. Any residual gas trapped in compartment 12 after refueling will first go through system TE after vessel 65 is empty, by placing the entrance to line 15 at the top of compartment 12. Normally closed globe valve 62 allows compressor 61 to discharge liquid fuel into vessel 65, is open when compressor 61 draws from compartment 12 and discharges to vessel 65 prior to refueling, and closed at all other times. Swing check valve 63 ensures no backflow from vessel 65. Optional flapper check valve 64 protects vessel 65 from rapidly decompressing in the event line 58 ruptures between valve 63 and vessel 65.

Vessel 65 temporarily stows residual liquid fuel from compartment 12 while vessel V is being refueled with condition 2 fuel. Prior to refueling, valves 59 and 62 open and compressor 61 will start. As soon as compression is complete, compressor 61 stops and valves 59,62 close. Refueling then commences. When refueling is complete, compartment 14 is pressurized and valves 67,70 open. Once compartment 12 is refueled and compartment 14 is fully repressurized, valve 16 will configure to draw from vessel 65 and discharge to system TE, and continue to so draw until vessel 65 is fully bled. Valve 16 then configures to draw from compartment 12 and discharge to system TE. The system will continue to operate in this manner until the next refueling. Discharge line 66 provides means for residual fuel charged in vessel 65 to flow through valve 16 to system TE, into compartment 14 and engine 141. Normally open globe valve 67 regulates flow from vessel 65 to valve 16. Swing check valve 68 ensures no back-flow through line 66.

Line 69 acts as a discharge line when the valves are configured so that valve 16 receives fuel from vessel 65. During normal operation, fluid flow from vessel 65 to valve 16 and system TE is through compressor 61 even though not charged. Swing check valve 71 ensures no back-flow of fluid through the liquid initialization system discharge line 69. Components 72–80 comprise a decompression and purge system for the liquid initialization subsystem APA just described. Components 81–88 comprise an over-pressure relief system for pressure vessel 65.

In gaseous subsystem APB, gas initialization system suction line 89 draws gaseous fuel from compartment 14 to line 129 and system FT to engine 141. Simultaneously, liquid fuel from compartment 12 flows through system TE into compartment 14 to replenish fuel consumed by engine 141. Piston 13 slowly moves to the right at the rate liquid fuel is drawn from compartment 12. When piston 13 is in the right-most position, compartment 14 has a maximum amount of gaseous fuel. When compartment 14 depressurizes, residual gaseous fuel flows through lines 89 and 90 and compressor 99 into gas initiation pressure vessel 103 for stowing the residual gas while vessel V is refueled. The volume of vessel 103 must be at least as large as the maximum volume of compartment 14 of vessel V for reasons substantially the same as described above in the analysis comparing the volumes of vessel 65 and compartment 12 of vessel V. If the system is being refilled with fuel in condition 1, incoming fuel pressure in compartment 12 forces piston 13 to the left and forces residual gaseous fuel in compartment 14 through lines 89 and 93 into vessel 103. During condition 1 refueling using the first configuration (see FIG. 5), fuel travels from line 89 through line 93 into vessel 103. During condition 2 refueling using the first configuration, fuel travels from line 89 and through line 90 into vessel 103. The reason for this is line 90 will be able to supply the suction of compressor 99 with residual gaseous fuel from compartment 14 without any resistance. Line 93 uses a pressure regulation system designed to maintain pressure in compartment 14 during condition 1 refueling so that constant pressure is maintained in compartment 12 during refueling.

Refueling line 90 allows the system to be refueled under condition 2 circumstances. This line, unlike line 93, and offers no resistance between compartment 14 and the suction side of compressor 99 during refueling. Line 93 acts as a pressure regulation system for compartment 14 during condition 1 refueling so that pressure is held constant in compartment 14, even as piston 13 moves to the left as the system is refueled. For condition 2 refueling, compartment 14 must be depressurized to ambient before any fuel can be introduced into compartment 12. During condition 1 refueling, compartment 14 remains pressurized via line 93, and compressor 99 will not be charged even though gas from compartment 14 flows through it.

Normally closed globe valve 91, along with normally closed gate valve 94, normally open gate valve 98 and normally open globe valve 108, isolates compartment 14 from the gas side of subsystem APB when not in use. Valve 91 is only open during condition 2 refueling, so that compressor 99 may draw suction from compartment 14 to vessel 103. Valve 94 is open only during condition 1 refueling to allow piston 13 to force residual gas from compartment 14 to vessel 103 as it is forced to the left by the condition 1 fuel flowing into compartment 12, and closed during condition 2 refueling and all other times. Valve 98 allows isolation and removal of low-pressure cut-out regulator valve 95. Valve 108 and valve 105 are closed only when vessel 103 is being compressed during the refueling process. Swing check valve 92 prevents back-flow through suction line 90 to compartment 14.

Refueling line 93 allows the system to be refueled under condition 1 circumstances, and, unlike line 90, maintains constant pressure in compartment 14 during condition 1 refueling to prevent ambient temperature fuel in compartment 12 from flashing into vapor. Line 90 offers no resistance between compartment 14 and the suction side of compressor 99 for condition 2 refueling, because compartment 14 must be depressurized during condition 2 refueling.

Low-pressure cut-out regulator valve 95 ensures that pressure in compartment 14 does not change when gaseous fuel is forced through lines 89 and 93 into vessel 103 during condition 1 refueling in order to keep residual and incoming liquid fuel in compartment 12 as a liquid regardless of the position of piston 13. As fuel is pumped into compartment 12, piston 13 will be forced to the left and the residual gaseous fuel in compartment 14 will be forced to go through line 93 to vessel 103. As pressure goes up in compartment 14 due to the incoming fuel in compartment 12 forcing piston 13 to the left, valve 95 will open and allow gaseous fuel to pass to vessel 103. Valve 95 opens in proportion to the rate of condition 1 fuel entering compartment 12 to throttle the flow of gaseous fuel into vessel 103 to maintain constant pressures in compartments 12 and 14. During condition 1 refueling, the pressure in compartment 14 only has to increase very slightly to actuate valve 95. If the pressure decreases to normal operating pressure, valve 95 will close in an effort to maintain operating pressure at a minimum. By not allowing the pressure in compartment 14 to decrease below a specified normal operating pressure during condition 1 refueling, a definite force will always exist on the left crown of piston 13 and compartment 12 will remain at a constant pressure during refueling, and constant saturation temperature is maintained and held above ambient, and the residual and incoming liquid fuel in compartment 12 will remain liquid regardless of the position of piston 13. Valve 95 will either be pressure activated, downward seated, with spring force acting on the top of the actuator diaphragm, and ambient pressure from compartment 14 acting on the bottom, or be pressure activated, upward seated, with spring force acting on the bottom of the actuator diaphragm, and ambient pressure from compartment 14 acting on the top of the actuator diaphragm. Valve 95 is set to open a few psi above compartment 14 normal operating pressure and to close at about the normal operating pressure. Swing check valve 96 ensures no back-flow through line 93.

Pressure regulator valve actuator line 97 actuates low-pressure cut-out regulator valve 95, exposing one side of the actuator diaphragm to the ambient pressure in compartment 14 and opposing an adjustable spring force on the other side of the actuator diaphragm. If compartment 14 pressure decreases during condition 1 refueling, the spring force in the actuator diaphragm of valve 95 will overcome the force caused by the ambient pressure in compartment 14 and close the valve to prevent more gas from escaping to keep compartment 14 pressurized.

Compressor 99 transports residual gaseous fuel from compartment 14 via lines 89 and 90 into vessel 103 during condition 2 refueling, until compartment 14 is near ambient pressure so that condition 2 liquid fuel can be pumped into compartment 12 via line 1. Compressor 99 must keep pressure in compartment 14 at ambient during condition 2 refueling while piston 13 moves to the left. During condition 1 refueling using the first configuration, gaseous fuel will pass through this compressor without it being charged.

Normally closed globe valve 100 allows compressor 99 to discharge gaseous fuel into vessel 103 prior to condition 2 refueling and allows piston 13 to force residual fuel to vessel 103 during condition 1 refueling. During condition 2 refueling, when compressor 99 draws from compartment 14 and discharges to vessel 103 prior to refueling, valve 100 is open. During condition 1 refueling, valve 100 is open when piston 13 forces residual fuel from compartment 14 to vessel 103 and is closed at other times. Valve 100, along with valves 91, 94, 98, 105, and 108, allows compressor 99 to be isolated and removed for maintenance. Swing check valve 101 blocks back flow from vessel 103. Flapper check valve 102 protects vessel 103 from rapidly decompressing if line 89 ruptures.

Gas initialization vessel discharge line 104 provides conduit means for compressed gaseous residual fuel in vessel 103 to flow to valve 110. Normally open globe valve 105 allows compressor 99 to draw from vessel 103 once the system has been refueled in condition 2 or allow gas to flow from vessel 103 to line 107 without using compressor 99 after the system is refueled in condition 1. Valves 105 and 108 are closed when vessel 103 is being compressed, during the actual refueling process, and open at all other times. Swing check valve 106 prevents back-flow through line 104.

Gas initialization system discharge line 107 acts as a discharge when the valves are configured so that suction is drawn from vessel 103 and discharged to valve 110. Swing check valve 109 prevents back-flow through line 107. After condition 2 refueling, valve 110 routes residual gas from vessel 103 to compartment 14 to repressurize it. The function of valve 110 is described in more detail above in relation to FIG. 2 and system FT. Components 115–127 comprise a decompression and purge subsystem for the gaseous initialization subsystem APB just described, and an overpressure relief subsystem for protection of vessel 103.

Figure 4:
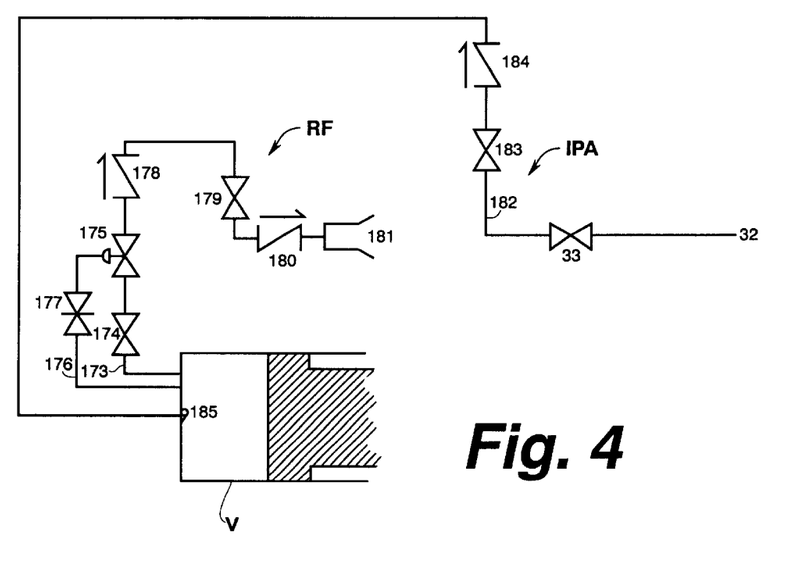
FIG. 4 shows a schematic diagram of an initial pressure actuation subsystem and return fuel subsystem of the invention.

Referring now to FIG. 4, shown therein is a schematic diagram of initial pressure actuation subsystem IPA and return fuel subsystem RF of the invention. Subsystems IPA and RF won't be needed (or included) for the first and second configurations but are required for the third configuration, because means are required for pressurizing compartment 14 with piston 13 in the right-most position prior to condition 1 refueling. System APB will be used instead of IPA and RF in the first and second configurations. In the third configuration, subsystem RF replaces system AP, which renders the third configuration substantially simplified by the elimination of system AP. Subsystem RF includes return feed system line 173 for returning gaseous fuel from compartment 14 to the pumping station during condition 1 refueling, so that piston 13 can move to the left as high pressure, ambient temperature fuel is pumped into compartment 12 while maintaining a constant pressure in compartment 14 so that the saturation temperature of the liquid fuel in compartment 12 is constant throughout the refueling process. Subsystem RF is used only for condition 1 refueling in the third configuration of the invention (see FIG. 7 discussion below).

Subsystem IPA is included only in the third configuration (see FIG. 7) for moving piston 13 to the right and pressurizing compartment 14 with gaseous fuel so that compartment 12 can be refueled with condition 1 fuel after being completely depressurized. This subsystem may be used substantially instead of vessel 103 included in the first and second configurations (see FIGS. 3, 5 and 6 and accompanying discussion). To initialize the system from a completely depressurized state, piston 13 must be moved to the far right-most position and compartment 14 must be pressurized with gaseous fuel so that normal condition 1 refueling can take place.

Figure 5:
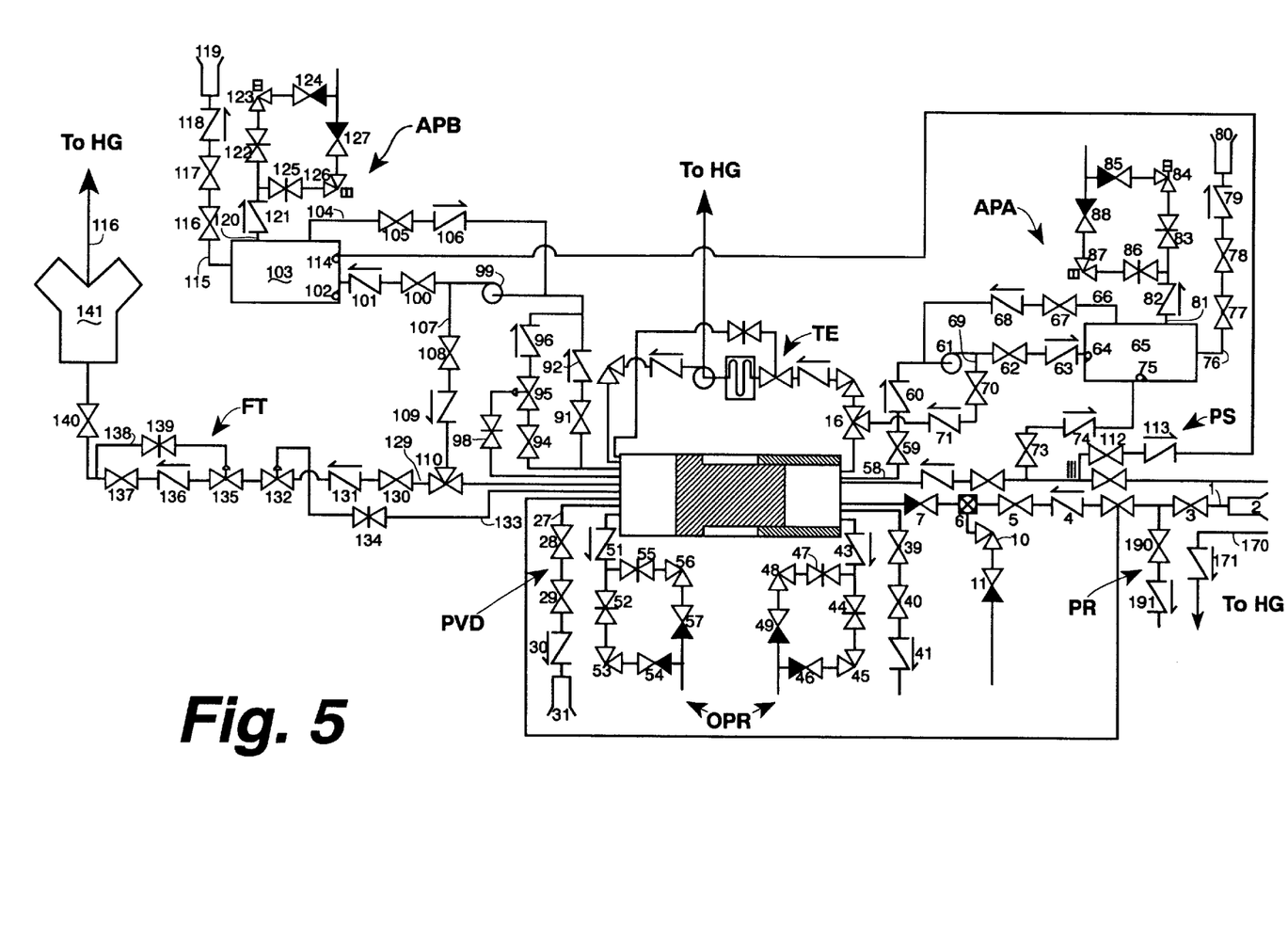
FIG. 5 shows a schematic diagram of a representative system of the invention in a first alternate configuration.
Figure 6:
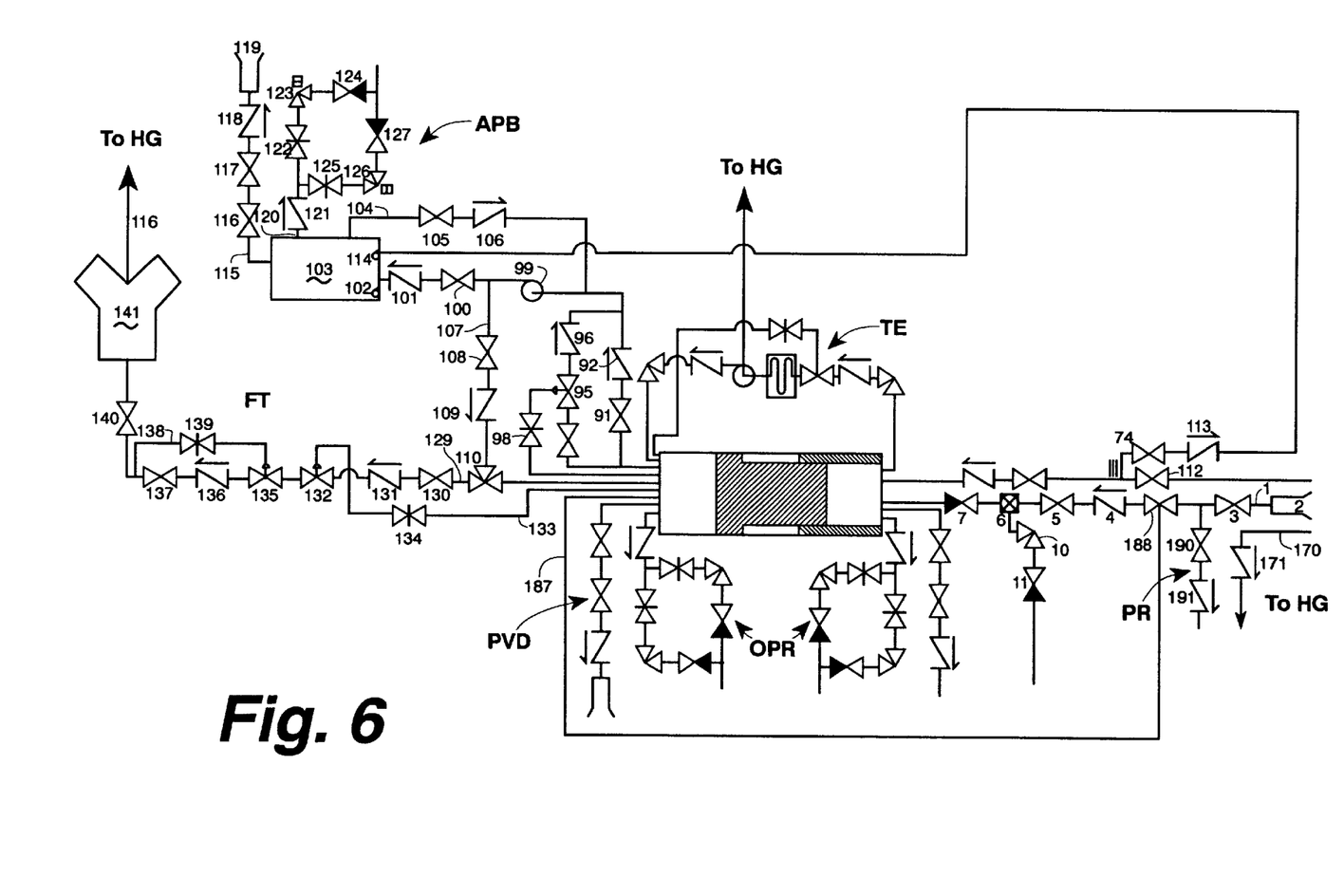
FIG. 6 shows a schematic diagram of a representative system of the invention in a second alternate configuration.
Figure 7:
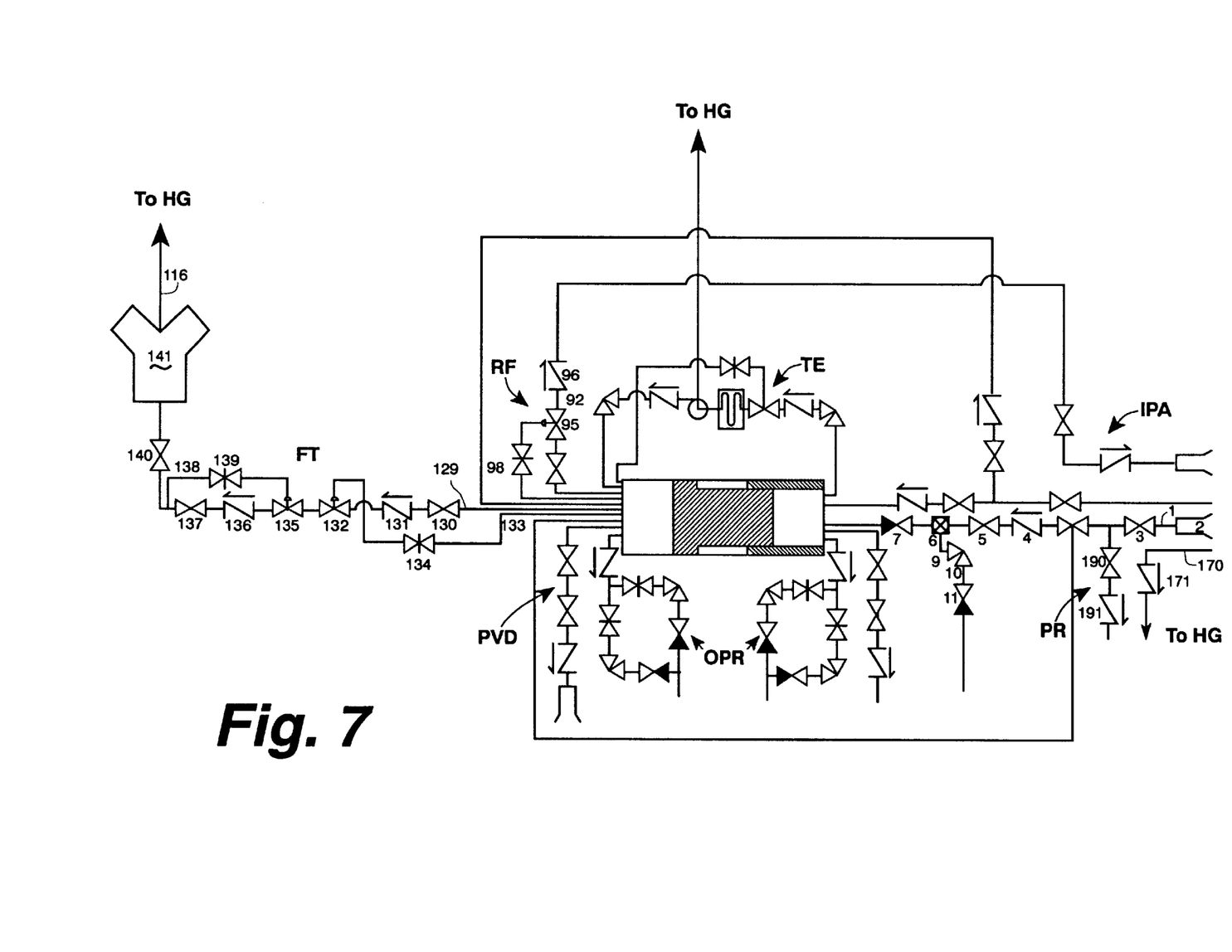
FIG. 7 shows a schematic diagram of a representative system of the invention in a third alternate configuration.

As suggested earlier, the invention contemplates three different system configurations. FIGS. 5,6,7 show schematic diagrams of respective representative systems of the invention in first, second and third alternate configurations. Subsystems includable in each configuration are shown by respective descriptive designations used previously in relation to FIGS. 1 through 4. The first and most complicated configuration (FIG. 5) would be used if fuel is pumped into vessel V in condition 1 or condition 2. The second (FIG. 6) and third (FIG. 7) configurations can be used only for condition 1 fuel. It is preferable that pumping stations offer fuel in condition 1 so that the second and preferably the lesser complicated third configuration may be used.

The second configuration operates similarly to the first during condition 1 refueling and excludes the subsystem (APA) components and complexity required for condition 2 refueling. Condition 2 refueling is undesirable for reasons discussed previously. The third configuration (FIG. 7) operates substantially identically to the first and second configurations, except that system AP may be replaced by subsystems RF and IPA, primarily to facilitate refueling.

The various subsystems of the invention as described above may be electrically operated and computer controlled, powered off the vehicle electrical system, and may include automatic, remotely operated, solenoid components with manual override. Components indicated as useful for isolation/removal of other components for maintenance or repair are considered optional, not limiting of the invention and further components may be added for safety or operational efficiency, by one skilled in the relevant art, within the spirit of the invention and the scope of the appended claims. Subsystems indicated as optional are also not considered limiting of the invention.

The invention therefore provides a fuel supply system for internal combustion engines using hydrogen, natural gas or other alternate fuel. It is understood that modifications to the invention may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A fuel supply system for an internal combustion engine, comprising:
   (a) a source of liquid fuel;
   (b) a pressure vessel including:
      (i) a substantially closed, generally tubular container having first and second ends, a first one-half of the internal length of said container having a first internal diameter and the second one-half of the internal length of said container having a second inner diameter larger than the first internal diameter;
      (ii) a movable piston disposed within said container, said piston having a first surface at a first end thereof defining an outer diameter substantially equal to the internal diameter of said first end of said container and slidably disposed within said first end of said container, and said piston having a second surface at the second end thereof defining an outer diameter substantially equal to the internal diameter of said second end of said container and slidably disposed within said second end of said container, said piston having a length measured between said first and second surfaces equal to about one-third the internal length of said container; and
      (iii) wherein said container with said piston slidably disposed therein define a first compartment at said first end of said container and second compartment at said second end of said container, said first and second compartments each having a maximum length equal to about one-third the internal length of said container, said piston sized and configured to contain fuel in the liquid phase in said first compartment and in the gaseous phase in said second compartment by maintaining substantially constant but different pressures, respectively, within said first and second compartments; and
      (iv) means defining a first inlet to said first compartment at said first end of said container and a second inlet to said second compartment at said second end of said container;
   (c) valve and conduit means interconnecting said source and said first inlet of said container for transporting said liquid fuel into said first compartment of said container at a first preselected pressure;
   (d) a thermal expansion system interconnecting said first and second compartments for controllably expanding said liquid fuel from said first compartment to a gas, at a second preselected pressure lower than the first preselected pressure, within said second compartment; and
   (e) valve and conduit means for transporting said gas from said second compartment to the engine for combustion therewithin.

2. The fuel supply system of claim 1 wherein said source of liquid fuel comprises a fuel selected from the group consisting of liquid hydrogen and liquid natural gas.

3. The fuel supply system of claim 1 wherein said thermal expansion system interconnecting said first and second compartments of said container include a thermal expansion valve for expanding said liquid fuel in said first compartment from a subcooled liquid to a saturated gas.

4. The fuel supply system of claim 3 further comprising a heat exchanger disposed between said thermal expansion valve and said second compartment to effect complete transformation of the said liquid fuel to a gas.

5. The fuel supply system of claim 4 further comprising a compressor disposed between said heat exchanger and said second compartment for maintaining said gaseous fuel within said second compartment at said second preselected pressure.

6. In a fuel supply system for an internal combustion engine wherein a source of liquid fuel is thermally expanded to gaseous form for combustion within the engine, an improvement wherein a pressure vessel is disposed between the source of liquid fuel and the engine, the pressure vessel comprising:
   (a) a substantially closed, generally tubular container having first and second ends, a first one-half of the internal length of said container having a first internal diameter and the second one-half of the internal length of said container having a second inner diameter larger than the first internal diameter;
   (b) a movable piston disposed within said container, said piston having a first surface at a first end thereof defining an outer diameter substantially equal to the internal diameter of said first end of said container and slidably disposed within said first end of said container, and said piston having a second surface at the second end thereof defining an outer diameter substantially equal to the internal diameter of said second end of said container and slidably disposed within said second end of said container, said piston having a length measured between said first and second surfaces equal to about one-third the internal length of said container; and
   (c) wherein said container with said piston slidably disposed therein define a first compartment at said first end of said container and second compartment at said second end of said container, said first and second compartments each having a maximum length equal to about one-third the internal length of said container, said piston sized and configured to contain fuel in the liquid phase in said first compartment and in the gaseous phase in said second compartment by maintaining substantially constant but different pressures, respectively, within said first and second compartments.

7. In a fuel supply system for an internal combustion engine wherein a source of liquid fuel is thermally expanded to gaseous form for combustion within the engine, an improvement comprising:
   (a) a pressure vessel disposed between the source of liquid fuel and the engine, the pressure vessel including:
      (i) a substantially closed, generally tubular container having first and second ends, a first one-half of the internal length of said container having a first internal diameter and the second one-half of the internal length of said container having a second inner diameter larger than the first internal diameter;
      (ii) a movable piston disposed within said container, said piston having a first surface at a first end thereof defining an outer diameter substantially equal to the internal diameter of said first end of said container and slidably disposed within said first end of said container, and said piston having a second surface at the second end thereof defining an outer diameter substantially equal to the internal diameter of said second end of said container and slidably disposed within said second end of said container, said piston having a length measured between said first and second surfaces equal to about one-third the internal length of said container; and (iii) wherein said container with said piston slidably disposed therein define a first compartment at said first end of said container and second compartment at said second end of said container, said first and second compartments each having a maximum length equal to about one-third the internal length of said container, said piston sized and configured to contain fuel in the liquid phase in said first compartment and in the gaseous phase in said second compartment by maintaining substantially constant but different pressures, respectively, within said first and second compartments; and (iv) means defining a first inlet to said first compartment at said first end of said container and a second inlet to said second compartment at said second end of said container;

(c) valve and conduit means for interconnecting said first inlet of said container with a source of liquid fuel for transporting liquid fuel into said first compartment of said container at a first preselected pressure;

(d) a thermal expansion system interconnecting said first and second compartments for controllably expanding liquid fuel from said first compartment to a gas, at a second preselected pressure lower than the first preselected pressure, within said second compartment; and (e) valve and conduit means for transporting said gas from said second compartment to the engine for combustion therewithin.

8. The fuel supply system of claim 7 wherein said thermal expansion system interconnecting said first and second compartments of said container include a thermal expansion valve for expanding liquid fuel from said first compartment to a gas.

9. The fuel supply system of claim 7 further comprising a heat exchanger disposed between said thermal expansion valve and said second compartment to effect complete transformation of liquid fuel to a gas.

10. The fuel supply system of claim 9 further comprising a compressor disposed between said heat exchanger and said second compartment for maintaining gaseous fuel within said second compartment at said second preselected pressure.

* * * * *